US010752804B2

(12) United States Patent
Aoyagi et al.

(10) Patent No.: US 10,752,804 B2
(45) Date of Patent: Aug. 25, 2020

(54) COATING AGENT

(71) Applicant: NICHIAS CORPORATION, Tokyo (JP)

(72) Inventors: Hideharu Aoyagi, Tokyo (JP); Tomokazu Watanabe, Tokyo (JP); Hideaki Mori, Tokyo (JP); Hirotaka Natori, Tokyo (JP); Nahoko Kitajima, Tokyo (JP); Mai Fujiwara, Tokyo (JP); Jun Tachiki, Tokyo (JP); Jun Oikawa, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 15/321,235

(22) PCT Filed: Jun. 8, 2015

(86) PCT No.: PCT/JP2015/002867
§ 371 (c)(1),
(2) Date: Dec. 22, 2016

(87) PCT Pub. No.: WO2015/198543
PCT Pub. Date: Dec. 30, 2015

(65) Prior Publication Data
US 2017/0152397 A1 Jun. 1, 2017

(30) Foreign Application Priority Data
Jun. 24, 2014 (JP) ................. 2014-129304

(51) Int. Cl.
C09D 175/04 (2006.01)
F16J 15/02 (2006.01)
B32B 15/06 (2006.01)
C09D 7/40 (2018.01)
C09D 191/06 (2006.01)
B32B 27/40 (2006.01)
C08L 75/04 (2006.01)
C08G 18/80 (2006.01)
F02F 11/00 (2006.01)

(52) U.S. Cl.
CPC ............ C09D 175/04 (2013.01); B32B 15/06 (2013.01); B32B 27/40 (2013.01); C08G 18/80 (2013.01); C08L 75/04 (2013.01); C09D 7/40 (2018.01); C09D 191/06 (2013.01); F02F 11/00 (2013.01); F16J 15/022 (2013.01); B32B 2255/10 (2013.01); B32B 2307/554 (2013.01); B32B 2307/746 (2013.01); B32B 2581/00 (2013.01)

(58) Field of Classification Search
None
See application file for complete search history.

(56) References Cited

U.S. PATENT DOCUMENTS

| 4,576,987 | A |  | 3/1986 | Crockatt et al. |
|---|---|---|---|---|
| 5,106,675 | A | * | 4/1992 | Ara ...................... C09D 175/04 106/14.37 |
| 6,797,407 | B2 | * | 9/2004 | Kato ........................ B05D 7/16 428/336 |
| 8,530,016 | B2 |  | 9/2013 | Wang et al. |
| 9,156,998 | B2 |  | 10/2015 | Higashira et al. |
| 2002/0160203 | A1 |  | 10/2002 | Robertson |
| 2005/0118360 | A1 | * | 6/2005 | Huynh ..................... B41M 5/52 428/32.39 |
| 2006/0115665 | A1 | * | 6/2006 | Bolm ..................... C09D 5/033 428/480 |
| 2006/0121289 | A1 |  | 6/2006 | Robertson |
| 2006/0210737 | A1 |  | 9/2006 | Wang et al. |
| 2006/0251839 | A1 |  | 11/2006 | Wang et al. |
| 2009/0076222 | A1 | * | 3/2009 | Pugne ................ C08G 18/0823 525/123 |
| 2010/0136352 | A1 | * | 6/2010 | Higashira ............... B32B 15/06 428/462 |
| 2011/0143124 | A1 | * | 6/2011 | Yokota .................... C08L 27/18 428/323 |
| 2011/0315047 | A1 |  | 12/2011 | Wang et al. |
| 2013/0285334 | A1 | * | 10/2013 | Kojima .................. B32B 15/06 277/591 |
| 2014/0134368 | A1 |  | 5/2014 | Domes et al. |

FOREIGN PATENT DOCUMENTS

| CN | 101781515 A | * | 7/2010 |
| EP | 1 036 810 A2 |  | 9/2000 |
| EP | 1074309 A2 |  | 2/2001 |
| EP | 2664454 A1 |  | 11/2013 |
| JP | H03-252442 A |  | 11/1991 |
| JP | H05-341494 A |  | 12/1993 |
| JP | H06-221439 A |  | 8/1994 |
| JP | 07163941 A | * | 6/1995 |
| JP | H7-165953 A |  | 6/1995 |
| JP | H08-209113 A |  | 8/1996 |
| JP | 2001-310962 A |  | 11/2001 |
| JP | 2001-316584 A |  | 11/2001 |
| JP | 2002-121247 A |  | 4/2002 |

(Continued)

OTHER PUBLICATIONS

Aug. 4, 2015 International Search Report issued in International Patent Application No. PCT/JP2015/002867.

(Continued)

Primary Examiner — Cheng Yuan Huang
(74) Attorney, Agent, or Firm — Oliff PLC

(57) ABSTRACT

A coating agent includes a polyurethane and a hydrocarbon-based synthetic wax.

19 Claims, No Drawings

(56) References Cited

FOREIGN PATENT DOCUMENTS

| JP | 2002-309172 A | | 10/2002 |
|---|---|---|---|
| JP | 2003127265 A | * | 5/2003 |
| JP | 2003-213122 A | | 7/2003 |
| JP | 2008-189892 A | | 8/2008 |
| JP | 2008-537766 A | | 9/2008 |
| JP | 2008-260809 A | | 10/2008 |
| WO | 00/058086 A1 | | 10/2000 |
| WO | 02/10278 A1 | | 2/2002 |
| WO | 2008/126741 A1 | | 10/2008 |
| WO | 2012/096222 A1 | | 7/2012 |

OTHER PUBLICATIONS

Dec. 27, 2016 International Preliminary Report on Patentability issued in International Patent Application No. PCT/JP2015/002867.
Oct. 27, 2017 European Search Report issued in European Patent Application No. EP 15812796.9.
Sep. 19, 2019 Office Action Issued in European Patent Application No. 15 812 796.9.

* cited by examiner

COATING AGENT

TECHNICAL FIELD

The invention relates to a coating agent. In particular, the invention relates to a coating agent that is used for an elastic body that is used as a seal material or the like.

BACKGROUND ART

A coating film is normally provided to the surface of a rubber elastic body such as a rubber-coated metal gasket, a bearing seal, an oil seal, and an O-ring in order to prevent the occurrence of sticking and blocking, and improve wear resistance, for example. However, even if such a coating film is formed on the surface of an engine gasket, for example, when vibrations produced by the engine are applied under high-surface-pressure and high-temperature usage conditions, the rubber coating layer on the surface of the gasket may wear out, and leakage of gas may occur. A rubber coating layer on a sliding surface of a rubber elastic body such as a bearing seal or an oil seal may wear out due to repeated sliding, and leakage of oil may occur.

Various coating agents have been proposed in order to improve wear resistance (see Patent Literatures 1 to 4, for example). However, the coating agents disclosed in Patent Literatures 1 to 4 have a problem that if the resulting coating comes in contact with a member such as a flange, the coating strongly sticks to the contact member.

CITATION LIST

Patent Literature

Patent Literature 1: JP-A-H03-252442
Patent Literature 2: JP-A-H05-341494
Patent Literature 3: JP-A-2008-260809
Patent Literature 4: JP-A-2008-189892

SUMMARY OF INVENTION

An object of the invention is to provide a coating agent that can form a coating that exhibits low stickiness with respect to the contact member, and exhibits excellent wear resistance, and an elastic body and a rubber-metal laminate using the same.

The invention provides the following coating agent and the like.
1. A coating agent comprising a polyurethane and a hydrocarbon-based synthetic wax.
2. The coating agent according to 1, wherein the polyurethane is one or more polyurethanes selected from an aromatic-based polyurethane, an ester-based polyurethane, and an ether-based polyurethane.
3. The coating agent according to 1 or 2, wherein the hydrocarbon-based synthetic wax is one or more hydrocarbon-based synthetic waxes selected from a Fischer-Tropsch wax, a polyethylene wax, and acid-modified waxes thereof.
4. The coating agent according to any one of 1 to 3, wherein the coating agent comprises 20 to 90 wt % of the polyurethane and 10 to 80 wt % of the hydrocarbon-based synthetic wax.
5. The coating agent according to any one of 1 to 4, further comprising a curing agent.
6. The coating agent according to any one of 1 to 5, wherein the coating agent is to be applied to a surface of an elastic body.
7. An elastic body comprising a surface being covered with a coating film formed from the coating agent according to any one of 1 to 6.
8. The elastic body according to 7, wherein the elastic body is a seal material.
9. A rubber-metal stack comprising a surface being covered with a coating film formed from the coating agent according to any one of 1 to 6.

The invention thus provides a coating agent that can form a coating that exhibits low stickiness with respect to the contact member, and exhibits excellent wear resistance, and an elastic body and a rubber-metal laminate using the same.

DESCRIPTION OF EMBODIMENTS

The coating agent of the invention includes a polyurethane and a hydrocarbon-based synthetic wax. By containing these components, if a coating that is formed using the coating agent of the invention comes in contact with a member such as flange, the coating exhibits low stickiness to the contact member. The coating also exhibits excellent wear resistance at room temperature.

Polyurethane

A known polyurethane may be used as the polyurethane. It is preferable to use one or more polyurethanes selected from an aromatic-based polyurethane, an ester-based polyurethane, and an ether-based polyurethane as the polyurethane.

The term "aromatic-based polyurethane" used herein refers to a polyurethane that includes a repeating unit that includes an aromatic group. Examples of the aromatic group include a substituted or unsubstituted aromatic hydrocarbon group having 6 to 14 carbon atoms.

The term "ether-based polyurethane" used herein refers to a polyurethane that includes a repeating unit that includes an ether linkage.

The term "ester-based polyurethane" used herein refers to a polyurethane that includes a repeating unit that includes an ester linkage.

A polyurethane that includes a repeating unit that includes an ether linkage and an ester linkage may also be used.

The polyurethane may be used in an acid-modified state. The coating agent exhibits excellent adhesion to the coating target when an acid-modified polyurethane is used. The polyurethane may be acid-modified using a method that oxidizes the polyurethane by heating in air, a method that treats the polyurethane with an acid, a method that uses a material (e.g., polyol) containing an acid (e.g., hydroxyl group or carboxy group) for use of polyurethane polymerization, or the like.

The weight average molecular weight of the polyurethane is not particularly limited, but is normally 1,000 to 1,000,000.

Hydrocarbon-Based Synthetic Wax

Specific examples of the hydrocarbon-based synthetic wax include a microcrystalline wax, a paraffin wax, a polyethylene wax, a Fischer-Tropsch wax, acid-modified waxes thereof, and the like. A polyethylene wax, a Fischer-Tropsch wax, and acid-modified waxes thereof are preferable since they have a high melting point, and exhibit friction wear resistance. The softening point of the hydrocarbon-based synthetic wax is preferably 100 to 170° C.

A Fischer-Tropsch wax has a softening point higher than that of a paraffin wax, and can produce a coating film that exhibits high strength at a high temperature, and exhibits excellent wear resistance at a high temperature.

A Fischer-Tropsch wax is produced using a method that uses coal as a raw material, and hydrogenates carbon monoxide to synthesize a hydrocarbon. A Fischer-Tropsch wax has an almost perfectly linear molecular structure that includes saturated hydrocarbons that are bonded linearly, and includes substantially no branches, and has a high melting point, high hardness, and low viscosity.

The coating agent exhibits excellent wear resistance at a high temperature when an acid-modified wax is used. The wax may be acid-modified using a method that oxidizes the wax by heating in air, a method that treats the wax with an acid, a method that uses a material (e.g., polyol) containing an acid (e.g., hydroxyl group or carboxy group) for use of polyurethane polymerization, or the like.

The coating agent according to the invention normally includes the polyurethane and the hydrocarbon-based synthetic wax in an amount of 20 to 90 wt % (preferably 30 to 85 wt %) and 10 to 80 wt % (preferably 15 to 70 wt %) on a solid basis, respectively. There is a tendency that wear resistance is improved as the amount of the wax increases.

The total content of the polyurethane and the hydrocarbon-based synthetic wax may be 70.0 wt % or more, or 80.0 wt % or more, or 90.0 wt % or more, or 95.0 wt % or more, based on the total solid content in the coating agent (composition).

Additional Component

The coating agent according to the invention may optionally include an additional component in addition to the polyurethane and the hydrocarbon-based synthetic wax. Examples of the additional component include a lubricant other than the hydrocarbon-based synthetic wax, a curing agent, a surfactant, and the like.

Examples of the lubricant include a silicone oil, graphite, and the like. Examples of the graphite include vein graphite, amorphous graphite, artificial graphite, and the like. The coating agent may or may not include graphite. Stickiness with respect to a flange may decrease when the coating agent includes graphite. However, a decrease in wear resistance at room temperature may occur when the coating agent includes graphite. It is preferable that the coating agent does not include graphite.

Examples of the curing agent include a compound that includes a reactive group (e.g., isocyanate group and epoxy group), and the like.

The coating agent according to the invention normally does not include a cellulose derivative. Since a cellulose derivative has inferior wear properties when heated, and has low dispersibility in an organic solvent, a decrease in film strength may occur.

Examples of the cellulose derivative include methyl cellulose, ethyl cellulose, carboxymethyl cellulose, carboxymethylethyl cellulose, hydroxyethyl cellulose, hydroxypropyl cellulose, ethylhydroxyethyl cellulose, and the like.

The above components are normally dispersed in a solvent to prepare the coating agent. Water or an organic solvent (e.g., aromatic hydrocarbon, ester, and ketone) may be used as the solvent. Examples of the organic solvent include toluene, xylene, ethyl acetate, butyl acetate, acetone, methyl ethyl ketone, methyl isobutyl ketone, di-n-propyl ketone, cyclohexanone, phorone, isophorone, ethyl cellosolve, methyl cellosolve, and the like. The degree of dilution with the solvent is appropriately selected taking account of the application thickness and the application method. The coating agent is normally prepared to have a solid content of about 1 wt % to about 20 wt %.

The coating agent according to the invention may be used for application on a surface of an elastic body.

Examples of the elastic body include a common rubber material such as a fluororubber, a nitrile rubber (NBR), a hydrogenated NBR, an ethylene-propylene (-diene) rubber, a styrene-butadiene rubber, an acrylic rubber, a chloroprene rubber, a butyl rubber, and a natural rubber.

The hardness of the elastic body is normally 10 to 200 $N/mm^2$. The wear resistance of the coating agent increases as the hardness of the elastic body increases. It is preferable that the elastic body have a hardness of 20 to 150 $N/mm^2$, for example. The hardness (Martens hardness) of the elastic body is measured using an ultra-microindentation hardness tester "ENT-2100" (manufactured by Elionix Inc.) and a Berkovich indenter.

The thickness of the coating layer formed using the coating agent is normally 0.5 to 10 μm, and preferably 1 to 6 μm.

The coating agent may be applied to a surface of a rubber using a dipping method, a spray method, a roll coating method, a flow coating method, an inkjet method, or the like. The application method is not limited thereto.

After applying the coating agent to a surface of a rubber, a heat treatment may be performed at 150 to 250° C. for 1 minute to 24 hours, for example.

The coating agent according to the invention may also be used as a coating agent for application to the surface of a rubber in a rubber-metal laminate that includes a metal sheet and a rubber layer. The rubber-metal laminate is a laminate that includes a metal sheet, an adhesive layer, and a rubber layer in this order, or a laminate that includes a metal sheet, a primer layer, and a rubber layer in this order, for example.

Examples of the metal sheet include a stainless steel sheet, a mild steel sheet, a galvanized steel sheet, an SPCC steel sheet, a copper sheet, a magnesium sheet, an aluminum sheet, an aluminum diecast sheet, and the like.

A primer layer is preferably formed on the metal sheet. The primer layer improves the heat resistance and the water resistance of the rubber-metal laminate in terms of the bonding of the rubber. In particular, it is desirable to form the primer layer when the rubber-metal laminate is used as a seal material.

Examples of the primer layer include a zinc phosphate coating, an iron phosphate coating, a dry-in-place chromate coating, a coating formed using a vanadium, zirconium, titanium, molybdenum, tungsten, manganese, zinc, or cerium compound, and the like. It is preferable to use a primer layer that includes an organometallic compound containing at least one chelate ring and an alkoxy group, or a primer layer obtained by further adding a metal oxide or silica to the above primer layer. It is more preferable to use a primer layer obtained by adding a hydrolysis-condensation product of an amino group-containing alkoxysilane and a vinyl group-containing alkoxysilane to these primer-layer components. The hydrolysis-condensation product may be used alone.

A vulcanizing adhesive that is selected taking account of the type of rubber to be vulcanized and bonded is normally applied onto the primer layer. For example, as an adhesive for NBR rubber, an adhesive such as a silane adhesive, a phenolic resin adhesive, an epoxy resin adhesive, and a polyurethane adhesive may be used.

An unvulcanized rubber compound may be applied onto the vulcanizing adhesive layer, and pressed with heating to form a rubber layer. A rubber composition may be dissolved or dispersed in an organic solvent to prepare a rubber coating agent, and the rubber coating agent may be applied to the vulcanizing adhesive layer, dried, and heated to form the rubber layer that is included in the rubber-metal laminate. A coating layer may be formed on the rubber layer using the coating agent according to the invention.

EXAMPLES

Example 1

Production of Rubber-Metal Laminate:

A stainless steel sheet (SUS304) having a thickness of 0.2 mm was used as a metal sheet. A surface of the stainless steel sheet was treated with an alkaline cleaning agent, and subjected to a phosphate-based chemical treatment to form an iron phosphate anti-rust coating. A primer (main component: phenolic resin) modified with an NBR rubber compound was applied on the anti-rust coating to form a primer layer.

A liquid rubber compound having the composition shown below was applied to the primer layer to a given thickness, and dried using a hot wind circulation oven at 60° C. for 1 minute to obtain an uncrosslinked rubber-metal laminate.
Composition of Rubber Compound:
  Nitrile rubber: 100 phr
  Zinc oxide: 5 phr
  Stearic acid: 0.5 phr
  Carbon: 80 phr
  Coumarone-indene resin: 3 phr
  Aging preventive: 2 phr
  Plasticizer: 10 phr
  Sulfur: 3 phr
  Vulcanization accelerator: 2 phr 7 g of an aromatic-based polyurethane ("U3003" manufactured by Toho Chemical Industry Co., Ltd., solid content: 33 wt %), 0.85 g of a hydrocarbon-based synthetic wax (Fischer-Tropsch wax) ("Sasol Wax H1" manufactured by Sasol Wax), and 25.35 g of distilled water were mixed to prepare a coating agent so that the solid content of polyurethane and wax was 9.5 wt %.

The coating agent was applied to the uncrosslinked material of the rubber-metal laminate, and heated using a hot wind circulation Geer oven at 240° C. for 10 minutes to form a coating layer on the rubber-metal laminate. The thickness of the coating layer was 1 μm, and the surface hardness of the rubber-metal laminate was 35 N/mm².

The coating layer formed on the rubber-metal laminate was evaluated as described below. The results are listed in Table 1.
Stickiness Test:

The rubber-metal laminate was cut to obtain two pieces having a width of 20 mm and a length of 50 mm. The pieces were bonded so that the coating layers came in contact with each other in a 20×20 mm contact area, sandwiched between stainless steel sheets having a thickness of 3 mm, and compression-bonded at 100° C. for 24 hours under a pressure of 5 MPa to obtain a specimen. After allowing the specimen to cool to room temperature, the bonded rubber-metal laminate pieces were pulled with the hands, and the surface stickiness was evaluated in accordance with the following standard.
  Good; The pieces were easily separated with the hands.
  Fair; The pieces were separated when the specimen was warped.
  Bad; The pieces were separated when the specimen was pulled.
Friction Wear Test:

The rubber-metal laminate was cut to prepare a specimen having a width of 50 mm and a length of 80 mm. The specimen was subjected to a friction wear test using a pin-on-disk friction wear tester ("FPR-2100" manufactured by Rhesca Co., Ltd.) in which a pin having a diameter of R5 was used at a linear velocity of 63.25 mm/sec, a radius of reciprocation of R40, and an angle of reciprocation of 36° under a load of 5,000 g at 25° C. or 2,500 g at 150° C. to measure the number of reciprocations until the coating layer and the rubber layer wore out to expose the metal surface.

Examples 2 to 9 and Comparative Examples 1 to 6

A coating agent was prepared and evaluated in the same manner as in Example 1, except that components listed in Table 1 were used as solid components in an amount listed in Table 1 wherein distilled water and the solvent were removed. The results are listed in Table 1. The components listed below were used.

In Comparative Example 4, the rubber-metal laminate only was evaluated without using the coating agent. The stickiness between the rubber layers was measured during the stickiness test, and the number of reciprocations until the rubber layer wore out to expose the metal surface was measured during the friction wear test.
Binder:
Ester/ether-based polyurethane ("SUPERFLEX 126" manufactured by DKS Co. Ltd., solid content: 29.1 wt %)
Ether-based polyurethane ("SUPERFLEX 130" manufactured by DKS Co. Ltd., solid content: 34.8 wt %)
Cellulose ("METOLOSE SM4000" manufactured by Shin-Etsu Chemical Co., Ltd.)
Polybutadiene-based resin ("TP1001" manufactured by Nippon Soda Co., Ltd., solid content: 50 wt %)
Curing agent:
Block isocyanate ("ELASTRON BN-77" manufactured by DKS Co. Ltd., solid content: 30 wt %)
Lubricant:
Hydrocarbon-based synthetic wax: acid-modified polyethylene wax ("E-9015" manufactured by Toho Chemical Industry Co., Ltd., solid content: 40 wt %)
Hydrocarbon-based synthetic wax: polyethylene wax ("Hi-WAX 220P" manufactured by Mitsui Chemicals Inc.)
Silicone oil ("KF-96-1000cs" manufactured by Shin-Etsu Chemical Co., Ltd.)
Graphite ("C-1" manufactured by Nichiden Carbon Co., Ltd.)

TABLE 1

| | | | Example | | | | | | | | |
|---|---|---|---|---|---|---|---|---|---|---|---|
| | | Trade name | 1 | 2 | 3 | 4 | 5 | 6 | 7 | 8 | 9 |
| Binder | Aromatic-based polyurethane | U3003 | 73.1 | 53.8 | | | 53.8 | 73.1 | 73.1 | 26.9 | 54.8 |
| (wt %) | Ester/ether-based polyurethane | SUPERFLEX 126 | | | 53.8 | | | | | | |

TABLE 1-continued

| | | Trade name | | | | | | | | | |
|---|---|---|---|---|---|---|---|---|---|---|---|
| | Ether-based polyurethane | SUPERFLEX 130 | | | | | 53.8 | | | | |
| | Cellulose | METOLOSE SM4000 | | | | | | | | | |
| | Polybutadiene-based resin | TP1001 | | | | | | | | | |
| Curing agent (wt %) | Blocked isocyanate | ELASTRON BN-77 | | | | | | | | | 18.3 |
| Lubricant (wt %) Hydrocarbon-based synthetic wax | Fischer-Tropsch wax | Sasol Wax H1 | 26.9 | 46.2 | 46.2 | 46.2 | | | | | |
| | Acid-modified polyethylene wax | E-9015 | | | | | 46.2 | | 26.9 | 73.1 | 26.9 |
| | Polyethylene wax | Hi-WAX 220P | | | | | | 26.9 | | | |
| | Silicone oil | KF-96-1000cs | | | | | | | | | |
| | Graphite | C-1 | | | | | | | | | |
| | Total (wt %) | | 100.0 | 100.0 | 100.0 | 100.0 | 100.0 | 100.0 | 100.0 | 100.0 | 100.0 |
| Evaluation results | Stickiness test | Tack properties | Good | Good | Good | Good | Good | Good | Good | Good | Good |
| | Friction wear test (number of reciprocations) | 25° C. | 498 | 415 | 634 | 437 | 226 | 904 | 243 | 198 | 283 |
| | | 150° C. | 196 | 201 | 538 | 257 | 1,322 | 352 | 1,394 | 1,086 | 1,484 |

| | | | Comparative Example | | | | | |
|---|---|---|---|---|---|---|---|---|
| | | Trade name | 1 | 2 | 3 | 4 | 5 | 6 |
| Binder (wt %) | Aromatic-based polyurethane | U3003 | | | | | | |
| | Ester/ether-based polyurethane | SUPERFLEX 126 | | | | | | |
| | Ether-based polyurethane | SUPERFLEX 130 | | | | | | 73.1 |
| | Cellulose | METOLOSE SM4000 | | 19.3 | 17.4 | | | |
| | Polybutadiene-based resin | TP1001 | 52.7 | 48.3 | 43.5 | | | |
| Curing agent (wt %) | Blocked isocyanate | ELASTRON BN-77 | | | | | | |
| Lubricant (wt %) Hydrocarbon-based synthetic wax | Fischer-Tropsch wax | Sasol Wax H1 | 35.2 | 32.3 | 29.1 | | | |
| | Acid-modified polyethylene wax | E-9015 | | | | | | 100.0 |
| | Polyethylene wax | Hi-WAX 220P | | | | | | |
| | Silicone oil | KF-96-1000cs | | | | | 26.9 | |
| | Graphite | C-1 | 12.1 | | 10.0 | | | |
| | Total (wt %) | | 100.0 | 100.0 | 100.0 | 0.0 | 100.0 | 100.0 |
| Evaluation results | Stickiness test | Tack properties | Bad | Bad | Fair | Bad | Good | Good |
| | Friction wear test (number of reciprocations) | 25° C. | 156 | 803 | 613 | 22 | 41 | 131 |
| | | 150° C. | 707 | 282 | 281 | 16 | 25 | 622 |

INDUSTRRIAL APPLICABILITY

The coating agent according to the invention may be used for a rubber-made seal material such as an O-ring, V-packing, an oil seal, a gasket, packing, a square ring, a D-ring, and various valves, a dust boot for a constant-velocity joint and the like, a rubber product such as a diaphragm and a wiper blade, an engine, a motor, a storage device such as a hard disk drive, various vibration-proofing rubbers for an optical disk and the like, a head for a recording device such as a hard disk drive, and an impact-absorbing stopper for a printer head and the like.

Although only some exemplary embodiments and/or examples of the invention have been described in detail above, those skilled in the art will readily appreciate that many modifications are possible in the exemplary embodiments and/or examples without materially departing from the novel teachings and advantages of the invention. Accordingly, all such modifications are intended to be included within the scope of the invention.

The documents described in the specification, and the specification of the Japanese patent application to which the present application claims priority under the Paris Convention, are incorporated herein by reference in their entirety.

The invention claimed is:

1. A rubber-metal laminate comprising a metal sheet, a rubber layer and a coating layer in this order, the coating layer being formed from a coating agent comprising 26.9 to 73.1 wt % of a polyurethane, based on the total solid content in the coating agent, and 26.9 to 73.1 wt % of a hydrocarbon-based synthetic wax, based on the total solid content in the coating agent, wherein
   the polyurethane is an aromatic-based polyurethane,
   the hydrocarbon-based synthetic wax is an acid-modified polyethylene wax, and
   the coating agent does not comprise graphite.

2. The rubber-metal laminate according to claim 1, wherein the laminate further comprises an adhesive layer between the metal sheet and the rubber layer.

3. The rubber-metal laminate according to claim 1, wherein the laminate further comprises a primer layer between the metal sheet and the rubber layer.

4. The rubber-metal laminate according to claim 3, wherein the laminate further comprises an adhesive layer between the primer layer and the rubber layer.

5. The rubber-metal laminate according to claim 3, wherein the primer layer is formed directly on the metal sheet.

6. The rubber-metal laminate according to claim 5, wherein the primer layer is selected from the group consisting of a zinc phosphate coating, an iron phosphate coating, and a dry-in-place chromate coating.

7. The rubber-metal laminate according to claim 5, wherein the primer layer is a coating formed by using a vanadium, zirconium, titanium, molybdenum, tungsten, manganese, zinc, or cerium compound.

8. The rubber-metal laminate according to claim 5, wherein the primer layer includes an organometallic compound containing at least one chelate ring and an alkoxy group.

9. The rubber-metal laminate according to claim 5, further comprising a layer of vulcanizing adhesive, which is applied directly onto the primer layer.

10. The rubber-metal laminate according to claim 9, wherein the vulcanizing adhesive is selected from the group consisting of a phenolic resin adhesive, an epoxy resin adhesive, and a polyurethane adhesive.

11. The rubber-metal laminate according to claim 9, further comprising an unvulcanized rubber compound, which is applied directly onto the vulcanizing adhesive layer.

12. The rubber-metal laminate according to claim 9, wherein the rubber layer is formed by drying and heating a rubber coating agent, the rubber coating agent being directly applied to the vulcanizing adhesive layer.

13. The rubber-metal laminate according to claim 1, wherein the laminate is an engine gasket.

14. The rubber-metal laminate according to claim 1, wherein the coating agent has a solid content concentration of 1 to 20 wt %.

15. The rubber-metal laminate according to claim 1, wherein the metal sheet is selected from the group consisting of a stainless steel sheet, a mild steel sheet, a galvanized steel sheet, an SPCC steel sheet, a copper sheet, a magnesium sheet, an aluminum sheet, and an aluminum diecast sheet.

16. The rubber-metal laminate according to claim 1, wherein a thickness of the coating layer formed using the coating agent is in a range of from 0.5 µm to 10 µm.

17. The rubber-metal laminate according to claim 16, wherein the coating agent is applied to a surface of the rubber layer via a method selected from the group consisting of a dipping method, a spray method, a roll coating method, a flow coating method, and an inkjet method.

18. The rubber-metal laminate according to claim 1, wherein a softening point of the hydrocarbon-based synthetic wax is in a range of from 100° C. to 170° C.

19. The rubber-metal laminate according to claim 1, wherein the coating agent does not include any of the following cellulose materials: methyl cellulose, ethyl cellulose, carboxymethyl cellulose, carboxymethylethyl cellulose, hydroxyethyl cellulose, hydroxypropyl cellulose, and ethylhydroxyethyl cellulose.

* * * * *